Figure 1:
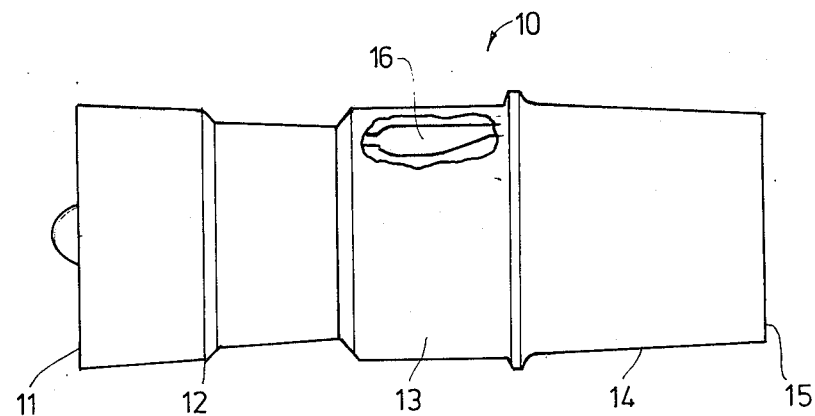

United States Patent [19]

Wood

[11] 3,906,718
[45] Sept. 23, 1975

[54] COMBUSTION APPARATUS FOR GAS TURBINE ENGINES

[75] Inventor: Robert David Wood, Derby, England

[73] Assignee: Rolls-Royce (1971) Limited, London, England

[22] Filed: Sept. 4, 1973

[21] Appl. No.: 394,395

[30] Foreign Application Priority Data
Sept. 7, 1972 United Kingdom............... 41504/72

[52] U.S. Cl............ 60/39.65; 60/39.71; 60/39.74 R
[51] Int. Cl.² ......................................... F02C 7/22
[58] Field of Search.......... 60/39.74 R, 39.65, 39.71

[56] References Cited
UNITED STATES PATENTS 2,999,359  9/1961  Murray .......................... 60/39.74 R
3,430,443  3/1969  Richardson et al............ 60/39.74 R
3,724,207  4/1973  Johnson........................ 60/39.74 R Primary Examiner—C. J. Husar
Assistant Examiner—Robert E. Garrett
Attorney, Agent, or Firm—Cushman, Darby & Cushman

[57] ABSTRACT

A combustion chamber for a gas turbine engine which has staged combustion in two toroidal vortices of opposite hand arranged one upstream of the other. A burner delivers air/fuel mixture in a radial direction to support the vortices and the burner has a convergent outlet for the air/fuel mixture.

2 Claims, 6 Drawing Figures

COMBUSTION APPARATUS FOR GAS TURBINE ENGINES

This invention relates to combustion apparatus for gas turbine engines in which the fuel supplied to a combustion chamber of the engine is discharged for combustion within the chamber.

It has been proposed to provide staged combustion for combustion chambers in order to improve combustion efficiency particularly in aircraft gas turbine engines at ground idling speed and to reduce smoke emission particularly at take-off. Such staged combustion has been achieved by delivering the fuel into the chamber already mixed with a proportion of air and causing this air/fuel mixture to be discharged so as to create a substantial toroidal vortex at the upstream end of the combustion chamber. At the same time, further secondary air has been introduced into the chamber downstream of the first toroidal vortex so that the secondary air causes a second substantially toroidal vortex to be generated which is of opposite hand to the first vortex.

During engine starting, the air/fuel mixture in the first toroidal vortex is of such strength as to be readily ignited by ignition means mounted in the region of the vortex. As the fuel flow to the combustion chamber increases upon throttle opening, the first toroidal vortex becomes over-rich in fuel and the majority of combustion is consequently transferred to the second toroidal vortex. When the fuel flow to the combustion chamber decreases as the throttle is closed, combustion is transferred back to the first toroidal vortex as a result of the weakening of the air/fuel ratio in the vortices.

It has further been proposed to mix the fuel and air by discharging the fuel into a burner tube where it is mixed with air flowing in the general downstream direction.

The air/fuel mixture impinges upon a deflection member positioned at the downstream end of the tube which deflects the mixture transversely so as to generate the said two vortices.

It has also been proposed to divide the tube of such a combustion apparatus into a number of passages extending axially of the engine so as to prevent the air/fuel mixture from swirling and to cause it to pass down the tube with substantially axial flow.

There are problems with staged combustion in that the flame tends to stabilise against projections or within recesses in the combustion chamber and this causes local burning of the chamber wall. This occurs particularly when fuel flow is being reduced and combustion is transferring to the first upstream vortex. There are also problems in finding a design of burner which will eject the air/fuel mixture with a substantially radial flow so as to support the two vortices at all combustion rates.

The present invention is intended to overcome the problems associated with staged combustion so as to give complete mixing of the fuel and air in the tube and so as to cause the mixture to be discharged in a direction substantially radially of the axis of the burner whereby it has been found that the double vortex combustion arrangement has considerable stability over the whole range of operating conditions in the engine.

In addition it has been found that the burner of the present invention does not provide any projection into the combustion chamber upon which a flame can stabilise so that the burner is not destroyed rapidly and has a useful life.

According to the invention there is provided combustion apparatus comprising a combustion chamber, first and second air inlet means for delivering air into said chamber, said first air inlet means communicating with a passage and means for supplying fuel to the passage, a deflecting member disposed for deflecting the air/fuel mixture at the downstream end of the passage in a direction substantially radially of said passage whereby to promote a substantially toroidal vortex circulating first radially outwards from said passage, then towards the upstream end wall of the combustion chamber and then downstream adjacent and substantially parallel to the passage, said secondary air inlet means being positioned to promote a secondary toroidal vortex immediately downstream of said first vortex and having a hand opposite to that of the first vortex, characterised in that said passage is defined by a portion of a cylindrical member and said member forms with said deflecting member a convergent outlet for directing the air/fuel mixture in the direction substantially radially of said passage.

Figure 3:
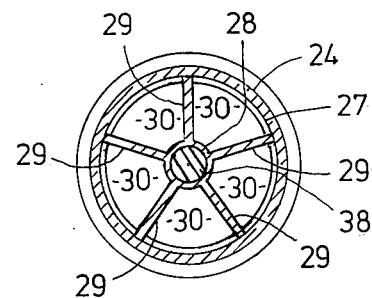
Figure 2:
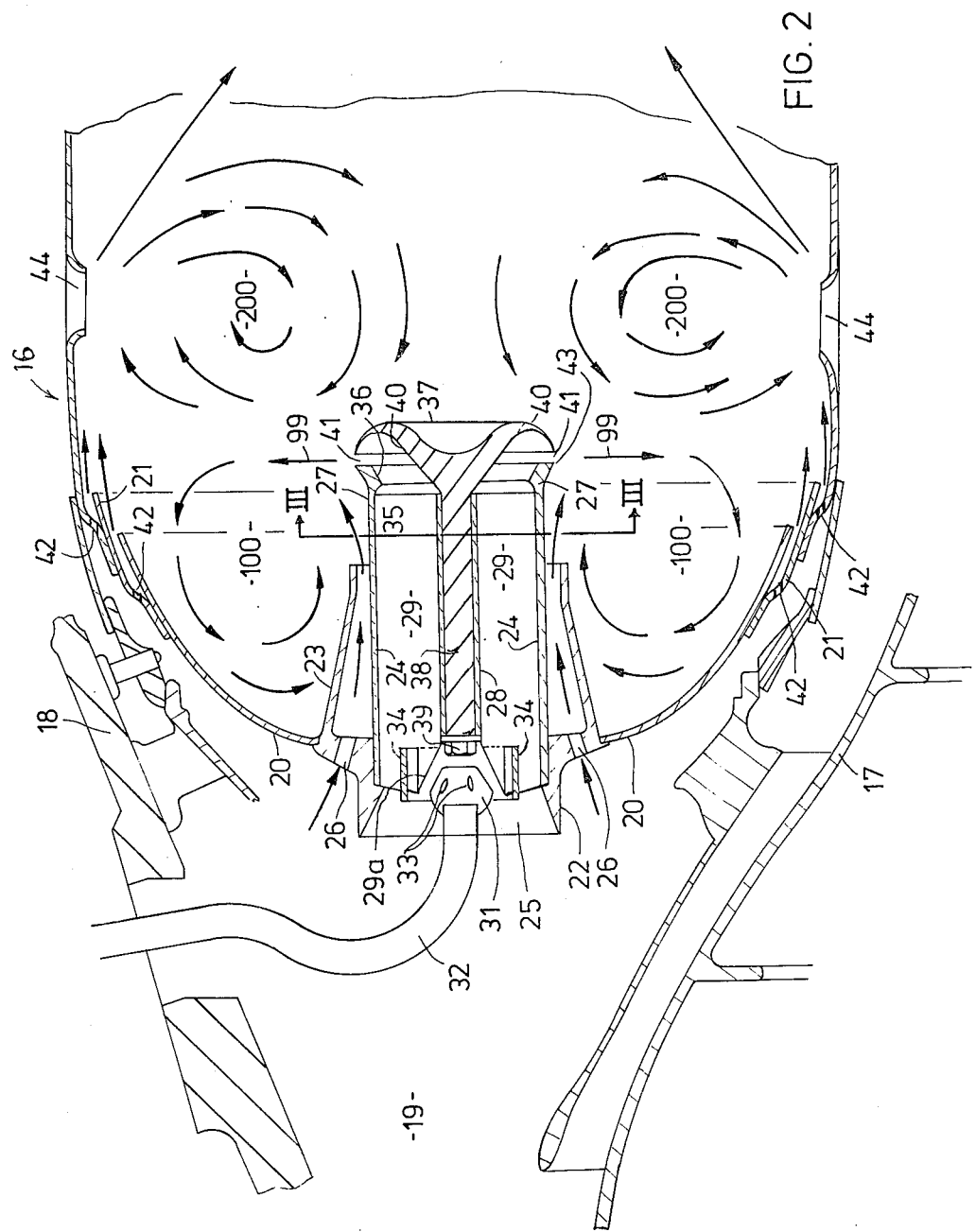
Figure 4:
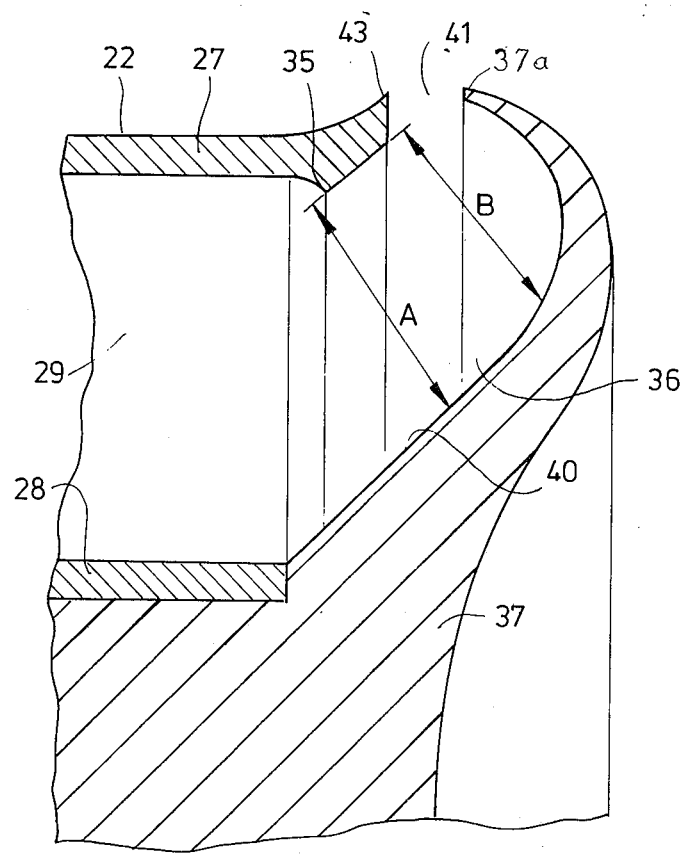
Figure 5:
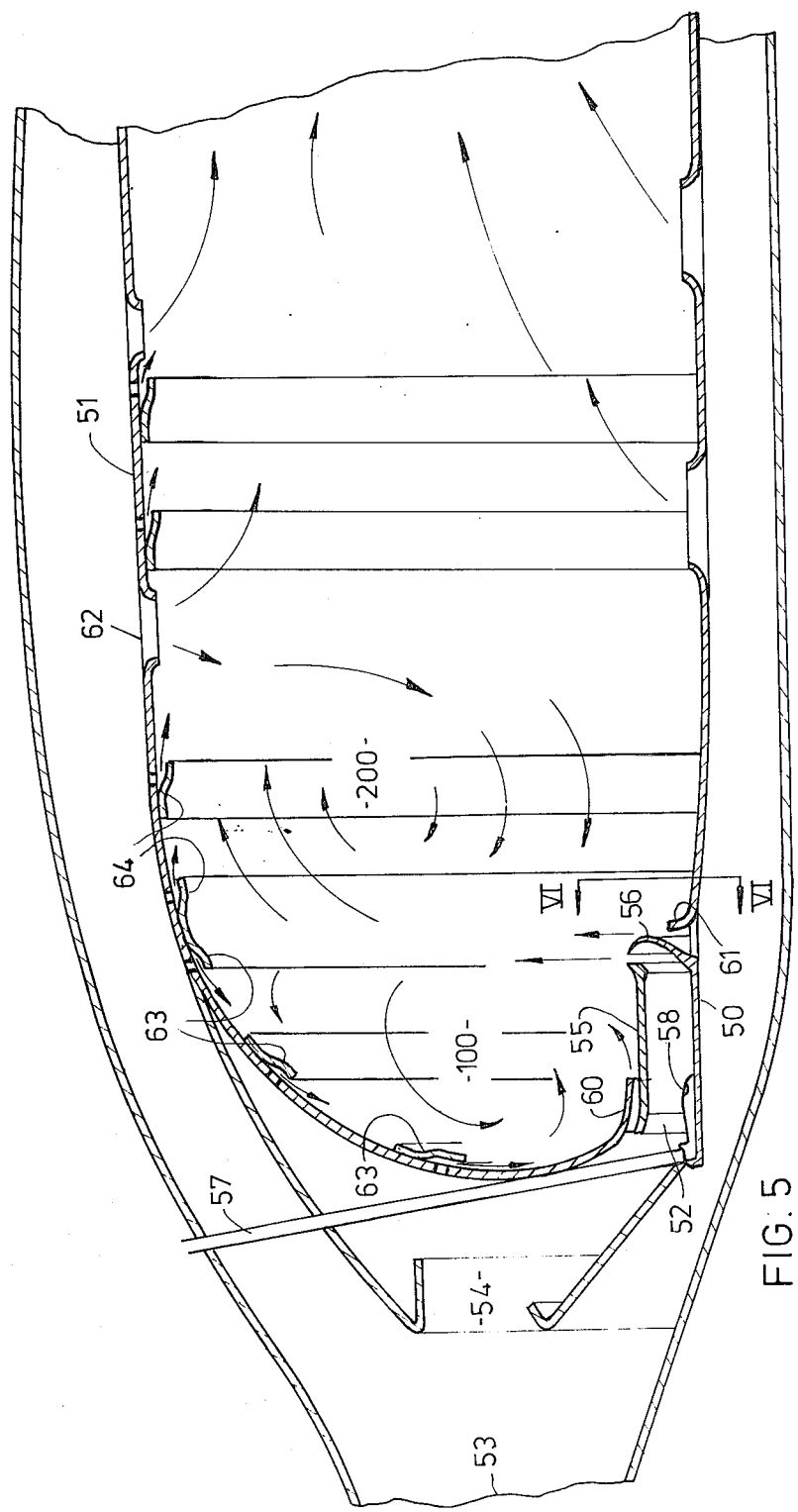
Figure 6:
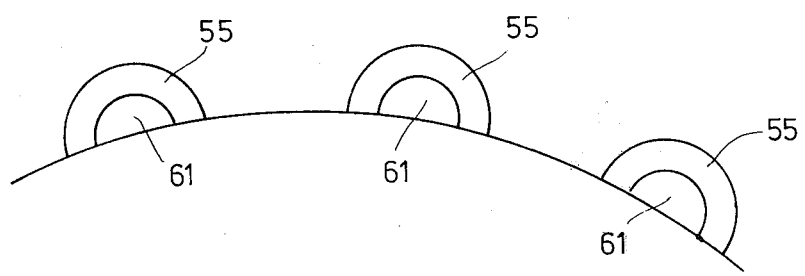

The invention is illustrated, merely by way of example, in the accompanying drawings, in which:

FIG. 1 is a partly sectioned side elevation of a gas turbine engine provided with combustion apparatus in accordance with the present invention, FIG. 2 is a partial longitudinal section of the combustion apparatus of the engine of FIG. 1, to an enlarged scale, FIG. 3 is a section taken on line III—III of FIG. 2, FIG. 4 is an enlarged detail of part of FIG. 2, FIG. 5 is a part longitudinal section of the combustion apparatus of another gas turbine engine which embodies an alternative form of the invention, and, FIG. 6 is a section taken along the line VI—VI of FIG. 5.

With reference to FIG. 1, a gas turbine engine generally indicated at 10 comprises, in axial flow series, an air intake 11, compressor means 12, combustion apparatus 13, turbine means 14 and an exhaust nozzle 15. Combustion apparatus 13 comprises a plurality of separate, substantially cylindrical combustion chambers, one of which can be seen at 16, circumferentially mounted around the axis of the engine 10 in the manner which is generally described as a "cannular" array.

The construction of the upstream portion of combustion chamber 16 can be seen more easily in FIG. 2. The combustion chamber 16, which is interposed between the radially inner and outer walls 17 and 18 of an air casing of the engine 10, is positioned so as to receive air compressed by the compressor means 12 via the duct 19. A combustor head 20 of the combustion chamber 16 is attached to the remainder of the chamber via a cranked cross-section ring 21. The centre of the combustor head 20 is apertured so as to provide a location for a burner 22 which is secured to the head 20.

The burner 22 provides an air/fuel mixture which issues radially of the end of the burner in the direction of arrow 99 to create a first toroidal vortex 100. This vortex 100 is ignited and burning air/fuel mixture is entrained in a second toroidal vortex 200 which is generated in part by the flow from burner 22 and in part by dilution air entering the chamber. The burning mixture passes from the second vortex in a generally downstream direction to the downstream exit of the combustion chamber.

The burner 22 includes an outer shroud member 23 within which is mounted a burner tube 24. The upstream end of the shroud member 23 defines a primary convergent air inlet 25 and a plurality of air holes 26. The burner tube 24 is mounted within the shroud member such that air from the primary air inlet 25 passes into tube 24 whilst air from the holes 26 passes along the external surface of tube 24.

The burner tube 24 consists of a cylindrical member 27 which encloses a hollow axially extending core portion 28 having five radially extending vanes 29 formed along its length to define five axial passages 30, which can be seen more easily in FIG. 3. Air entering inlet 25 is caused to divide into five parallel flows and the arrangement prevents any swirl component being imparted to the air passing through the burner tube 24. The radially inner portions of the upstream ends of the vanes 29 are chamfered at 29a so as to accommodate a nozzle head 31 of a fuel injector 32. The nozzle head 31 is provided with five fuel jets 33, each fuel jet 33 being associated with a corresponding axially extending passage 30. The fuel jets 33 are positioned so as to direct jets of fuel into the axial passages 30 in generally radial directions which have a slight downstream component i.e., approximately normal to the flow of air through the axial passages 30. A splash ring 34 is attached to the upstream ends of the vanes 29 such that it is co-axial with the axis of the core portion 28 and its perimeter is radially approximately mid-way between the axis of the core portion 28 and the periphery of the burner tube 24. The splash ring 34 is axially positioned such that the jets of fuel discharged from the nozzle head 31 will impinge on it and will tend to become atomised and entrained in the air flowing along tube 24.

Any wakes in or maldistribution of that portion of air which passes into the primary air inlet 25 are suppressed by the convergent configuration of the inlet. The primary air then passes over the nozzle head 31 where the fuel which is issued from jets 33 across the air flow is partially atomised. The portion of each of the fuel jets which is not immediately atomised impinges on the splash ring 34, thereby resulting in more fuel atomisation. Any remaining fuel which has not been atomised leaves the splash ring 34 in the form of a fuel film. Atomisation of this fuel film is effected by the interaction of the airflows which pass inside and outside the splash ring 34.

The downstream end of the burner 22 is shown enlarged in FIG. 4. The mixture passing down member 27 is confined in the five passages 30 in a substantially annular channel of uniform radial extent. At the downstream end of the member 27, the member is formed with an inwardly directed lip 35 which causes any fuel droplets adhering to the inside wall of the tube 27 to be given a radially inwards motion so as to be entrained in the air flowing along the tube. The burner 22 includes a deflecting member 37 which has an upstream facing surface 40 which, together with the inside surface of member 27 forms a smooth convergent outlet for the air/fuel mixture passing out of member 27. At the inwardly directed lip 35 the radial extent of this outlet is reduced and the flow is turned radially outwards and passes to an annular convergent portion 36 before being further turned to emerge through opening 41. The convergent portion 36 includes successively reducing cross-sections dimensioned "A" and "B". These are followed by a turning of the flow and a smooth convergence to the annular opening 41 from which the mixture is emitted in a direction substantially radially with respect to the fore and aft direction of the engine and burner. The outer portions of member 37 adjacent opening 41 are so shaped as to give the mixture impinging on them a substantially upstream and radially outward component of flow, which together with the downstream motion of the remaining flow, causes the flow out of opening 41 to be substantially radial.

The opening 41 is defined by a lip 43 and the outermost portion 37a of the member 37 and is an annular opening having its plane lying substantially parallel to the longitudinal axis of the engine. The disposition of opening 41 assists in ensuring that the flow out of the burner emanates radially.

The deflecting member 37 has a cylindrical portion 38 which locates in the hollow centre of the core portion 28. The cylindrical portion 38 is threaded at the end remote from the deflecting member 37 in order that it may be retained within the core portion 28 by means of a nut 39. The air which enters the holes 26 and passes through the annular duct defined by the shroud member 23 and the burner tube 24 assists in the cooling of the burner tube 24. The shroud air issuing from this annular duct passes over the radially outer surface of the cylindrical member 27 and impinges on the air/fuel mixture discharged from the annular opening 41, thereby urging the mixture in a direction substantially radially of the central axis of the cylindrical member 27 and hence into the substantially toroidal vortex 100. The vortex 100 circulates towards the combustor head 20 of the combustion chamber 16 and then back along the radially outer surface of the shroud member 23 towards the opening 41, the shroud air passing over the radially outer surface of the cylindrical member serving to reinforce the vortex. The radially extending lip 43 is provided on the downstream edge of the cylindrical member 27 in order to suppress any incipient turbulence at the confluence of the shroud air and air/fuel mixture flows. The diameter of the lip 43 and the deflecting plate 37 are arranged to be substantially equal in order to avoid any tendency of the sharp edge of the deflecting member 37 to burn. The combustion chamber 16 has a series of cooling strips which are fed air through holes 42 which produce film cooling on the inside of the chamber to prevent heat degradation of the chamber wall.

Part of the portion of air which passes around the external surface of the combustion chamber 16 enters the chamber via a plurality of secondary air inlets 44 provided downstream of the deflecting member 37. As the axes of the secondary air inlets 44 are approximately normal to the air flow passing thereover, that air which enters the secondary air inlets 44 does so obliquely and helps to support the second substantially toroidal vortex 200. The vortex 200 thus formed lies immediately downstream of the first formed vortex 100 and is of opposite hand.

Thus two substantially toroidal vortices are formed in the combustion chamber 16 thereby permitting staged combustion, as hereinbefore described, to take place.

By ensuring that the air which passes through the burner tube 24 does so without having a swirl component imparted to it, then much higher tube velocities can be achieved thereby resulting in a very high relative air/fuel velocity and consequently more efficient fuel atomisation. Similarly as the greatest air pressure drop occurs across the annular opening 41, then the exhaust velocity of the air/fuel mixture from the opening 41 is relatively high thereby increasing fuel atomisation and mixing efficiency even further and also preventing flame stabilization, and consequently burning of the burner 22 in the region of the annular opening 41. As more efficient fuel atomisation and mixing results in a corresponding increase in combustion efficiency, then combustion chambers in accordance with the present invention may have increased combustion efficiency and decreased smoke emission.

Referring now to FIGS. 5 and 6, there is shown an annular combustion chamber of a gas turbine engine, that is to say the combustion chamber is disposed in a single annulus concentric with the fore and aft centre line of the engine. A series of burners 50 is disposed around the inner periphery of the combustion chamber 51. Each burner has a convergent inlet 52 for receiving air delivered to the combustion chamber along passage 53 and through a nose aperture 54. Each burner has a part-cylindrical tube 55 which is identical in respect of its downstream proportions to the tube 27 of FIGS. 2 and 3. The burner includes a deflecting member 56 which deflects the air/fuel mixture passing down tube 55 in an outwardly radial direction, the shape of the inner surface of member 56 being similar to the surface 40 of the burner of FIGS. 2 and 3. Thus the burner 55 provides a convergent outlet for the air/fuel mixture.

Fuel is delivered to the burner along a pipe 57 and discharged through a fuel jet 58.

The burner 55 is partially enclosed by a shroud 60 and air passes between the shroud 60 and burner 55 to cool the outer surface of the burner and to assist the rotation of the toroidal vortex 100.

Adjacent the downstream end of the member 56 the inner wall of the combustion chamber has a lip 61 which defines an aperture to allow a flow of air to cool member 56 and additionally to support the motion of the two vortices.

The combustion chamber includes secondary air openings 62 in its outer wall disposed to provide air which in part supports vortex 200. In addition the chamber includes cooling strips 63 which deliver a film of cooling air to the inside wall of a chamber in a generally upstream direction over the area where the upstream flow of vortex 100 would impinge on the chamber wall. The chamber also includes cooling strips 64 which provide downstream flowing cooling films over the area where the flow of vortex 200 would impinge on the wall.

The particular arrangement of burners 50 to suit an annular combustion chamber is illustrated in FIG. 6. Each burner provides an outward radial flow and although all these flows are not precisely radial with respect to the axis of the engine the flows from adjacent burners merge to make the overall flow substantially radial. The part cylindrical tube 55 may be divided axially into a plurality of passages to prevent swirl and in this arrangement each passage has its own fuel jet 58.

In an alternative arrangement (not illustrated) of the invention applied to an annular combustion chamber the burners 55 are disposed around the outer periphery of the chamber. This avoids the use of the long fuel pipes 57 to each burner 55.

What I claim is:

1. Combustion apparatus comprising:
a combustion chamber having an upstream end wall and a downstream wall, openings in said chamber walls defining first and second air inlet means for delivering air into said chamber, a member extending axially downstream of said upstream end wall defining at least in part a passage which is in communication with said first air inlet means, means for supplying fuel to the passage, a deflecting member disposed for deflecting the air/fuel mixture at the downstream end of the passage in a direction substantially radially of said passage whereby to promote a substantially toroidal vortex circulating first radially outward from said passage, then upstream toward the upstream end wall of the combustion chamber and then downstream adjacent and substantially parallel to the passage, said secondary air inlet means being positioned to promote a secondary toroidal vortex immediately downstream of said first vortex and having a hand opposite to that of said first vortex, said member defining said passage being a cylindrical member which forms with said deflecting member an annular outlet, and a plurality of axially extending straight dividers which divide the passage into a plurality of axially extending straight sectors and which prevent swirl in the air/fuel mixture passing through the passage sectors wherein said outlet converges radially around its circumference and terminates in an annular discharge opening through which the air/fuel mixture is discharged into the combustion chamber.

2. Combustion apparatus comprising a combustion chamber having an upstream end wall and a downstream wall, openings in said chamber walls defining first and second air inlet means for delivering air into said chamber, a member extending axially downstream of said upstream end wall and defining at least in part a passage which is in communication with said first air inlet means, means for supplying a fuel to said passage, a deflecting member disposed for deflecting the air/fuel mixture at the downstream end of the passage in a direction substantially radially of said passage to thereby promote a substantially toroidal vortex circulating first radially outward from said passage, then upstream toward the upstream end wall of the combustion chamber and then downstream adjacent and substantially parallel to said passage, said secondary air inlet means being positioned to promote a secondary toroidal vortex immediately downstream of said first vortex and having a hand opposite to that of said first vortex, said member defining said passage including a plurality of axially extending straight dividers which divide the passage into a plurality of axially extending straight sectors and which prevent swirl in the air/fuel mixture passing along the passage sectors, said member defining said passage forming with said deflecting member an outlet wherein said outlet converges radially about its circumference and terminates in a circumferential discharge opening through which the air/fuel mixture is discharged into the combustion chamber.

* * * * *